(12) United States Patent
Jacob et al.

(10) Patent No.: US 6,698,119 B2
(45) Date of Patent: Mar. 2, 2004

(54) DECORATED EAR TAGS FOR DOMESTIC ANIMALS AND METHOD OF MAKING SAME

(75) Inventors: Ted Jacob, Rochester, MI (US); Bill Johnson, Scottsdale, AZ (US)

(73) Assignee: Farnam Companies, Inc., Phoenix, AZ (US)

( * ) Notice: Subject to any disclaimer, the term of this patent is extended or adjusted under 35 U.S.C. 154(b) by 226 days.

(21) Appl. No.: 09/757,633

(22) Filed: Jan. 11, 2001

(65) Prior Publication Data

US 2002/0090479 A1 Jul. 11, 2002

(51) Int. Cl.[7] .................................................. G09F 3/00
(52) U.S. Cl. ........................ 40/300; 40/299.01; 40/301; 40/302
(58) Field of Search ..................... 40/301, 302, 299.01, 40/300; 428/98, 195

(56) References Cited

U.S. PATENT DOCUMENTS

| | | | |
|---|---|---|---|
| 3,552,051 A | | 1/1971 | Ritchey |
| 3,765,113 A | * | 10/1973 | Magee ........................ 40/300 |
| 3,867,777 A | | 2/1975 | Potter |
| 3,916,904 A | | 11/1975 | Ritchey |
| 3,934,368 A | | 1/1976 | Fearing |
| 3,952,438 A | | 4/1976 | Propst et al. |
| 3,959,908 A | | 6/1976 | Lowe |
| 4,065,753 A | | 12/1977 | Paul |
| 4,184,453 A | | 1/1980 | Ritchey |
| 4,260,646 A | | 4/1981 | Farrell et al. |
| 4,262,632 A | | 4/1981 | Hanton et al. |
| 4,265,876 A | * | 5/1981 | Feakins ........................ 215/256 |
| 4,352,253 A | | 10/1982 | Oswalt |
| 4,359,015 A | | 11/1982 | Ritchey |
| 4,398,637 A | | 8/1983 | Fleury |
| 4,510,495 A | | 4/1985 | Sigrimis et al. |
| 4,535,557 A | | 8/1985 | Porcher |
| 4,541,402 A | | 9/1985 | Winters |
| 4,597,208 A | | 7/1986 | Chevillot |
| 4,597,495 A | | 7/1986 | Knosby |
| 4,631,231 A | * | 12/1986 | Stendel et al. .............. 428/413 |
| 4,646,455 A | | 3/1987 | Gardner |
| 4,694,781 A | | 9/1987 | Howe et al. |
| 4,712,511 A | | 12/1987 | Zamzow et al. |
| 4,739,565 A | | 4/1988 | Reggers |

(List continued on next page.)

FOREIGN PATENT DOCUMENTS

| | | |
|---|---|---|
| AU | A-64363/96 | 3/1997 |
| BE | 1007453 A3 | 7/1995 |
| CH | 667 773 | 11/1988 |

(List continued on next page.)

OTHER PUBLICATIONS

"Custom Laser Marked Global Tags Policies and Terms, Effective Oct. 15, 1999".
"Electronic Identification Device", Research Disclosure, pp 406–410 (Jul. 1996) (with translation).
"Metering Rod Coater", Faustel Technigram.
"Applied Coating Amounts wtih Metering Rods", Faustel Technigram.
"Thermal Transfer Printing".

(List continued on next page.)

Primary Examiner—Cynthia H. Kelly
Assistant Examiner—Tamra L. Dicus
(74) Attorney, Agent, or Firm—Jones Day

(57) ABSTRACT

A decorated ear tag for livestock is disclosed that comprises a pre-printed multi-layer label bonded to a suitable tag blank to form a unitary finished tag. The resulting tag, and the information displayed thereby, are extremely resistant to deterioration by sunlight and other elements. In addition, the surface of the information panel of the resulting tag has a high slip factor that discourages obscurement of the displayed information by manure or other materials adhering to the tag.

29 Claims, 7 Drawing Sheets

U.S. PATENT DOCUMENTS

| | | | |
|---|---|---|---|
| 4,741,117 A | | 5/1988 | Fearing |
| 4,750,284 A | | 6/1988 | Parry et al. |
| 4,837,272 A | | 6/1989 | Kelley |
| 4,864,750 A | | 9/1989 | Reggers |
| 4,909,250 A | | 3/1990 | Smith |
| 5,008,660 A | | 4/1991 | de Jong |
| 5,025,550 A | | 6/1991 | Zirbes et al. |
| 5,134,277 A | | 7/1992 | Yerbury et al. |
| 5,183,008 A | | 2/1993 | Carrano |
| 5,198,296 A | * | 3/1993 | Suzuki et al. ............... 428/336 |
| 5,228,224 A | | 7/1993 | Gardner |
| 5,258,766 A | | 11/1993 | Murdoch |
| 5,302,954 A | | 4/1994 | Brooks et al. |
| 5,322,034 A | | 6/1994 | Willham et al. |
| 5,344,808 A | * | 9/1994 | Watanabe et al. ........... 503/227 |
| 5,346,052 A | | 9/1994 | Fox |
| 5,469,170 A | | 11/1995 | Mariani |
| 5,473,830 A | | 12/1995 | Doble |
| 5,485,154 A | | 1/1996 | Brooks et al. |
| 5,489,456 A | * | 2/1996 | Instance .................... 428/41.8 |
| 5,499,626 A | | 3/1996 | Willham et al. |
| D379,253 S | | 5/1997 | Knapp et al. |
| 5,628,284 A | | 5/1997 | Sheen et al. |
| 5,653,192 A | | 8/1997 | Sheen et al. |
| 5,711,246 A | | 1/1998 | Yano et al. |
| 5,725,261 A | * | 3/1998 | Rahn ...................... 292/307 R |
| 5,733,651 A | | 3/1998 | Wank et al. |
| 5,815,355 A | | 9/1998 | Dawes |
| 5,862,599 A | | 1/1999 | Johnson et al. |
| 5,866,248 A | | 2/1999 | Dressler |
| 5,894,048 A | | 4/1999 | Eckart et al. |
| 5,945,201 A | | 8/1999 | Holat |
| 5,945,920 A | | 8/1999 | Maletsky |
| 6,016,618 A | * | 1/2000 | Attia et al. .................... 40/633 |
| 6,228,486 B1 | | 5/2001 | Kittel et al. |

FOREIGN PATENT DOCUMENTS

| | | |
|---|---|---|
| DE | 1 917 505 | 11/1998 |
| EP | 0 105 796 | 4/1984 |
| EP | 0 108 643 | 5/1984 |
| EP | 0 208 402 A2 | 1/1987 |
| EP | 0 486 377 A1 | 5/1992 |
| EP | 0 556 910 | 8/1993 |
| EP | 0 620 969 | 10/1994 |
| FR | 2 239 938 | 3/1975 |
| FR | 2 316 676 | 1/1977 |
| FR | 2 497 631 | 7/1982 |
| GB | 2 112 254 | 7/1983 |
| GB | 2 232 053 | 12/1990 |
| GB | 2 267 206 | 12/1993 |
| JP | 6327370 | 11/1994 |
| JP | 7306264 | 11/1995 |
| JP | 7306265 | 11/1995 |
| NL | 8703077 | 7/1989 |
| SU | 816454 | 3/1981 |
| SU | 895370 | 1/1982 |
| SU | 957808 | 9/1982 |
| SU | 1165334 | 7/1985 |
| SU | 1360672 | 12/1987 |
| SU | 1501995 | 8/1989 |
| SU | 1653675 | 5/1991 |
| SU | 1667772 | 8/1991 |
| WO | WO 97/04644 | 2/1970 |
| WO | WO 82/02788 | 8/1982 |
| WO | WO 94/14316 | 7/1994 |
| WO | WO 95/02957 | 2/1995 |
| WO | WO 96/04783 | 2/1996 |
| WO | WO 97/08646 | 3/1997 |
| WO | WO 97/24034 | 7/1997 |
| WO | WO 98/52406 | 11/1998 |
| ZA | 9500205 | 12/1996 |

OTHER PUBLICATIONS

"About Bar Coding: An Informative Overview to Bar Coding in the World Around You", from www.zebra.com (printed on Oct. 26, 2000).

Advertisement for EZCee Animal Identification Tag, Hoard's West Feb. 2001.

Research Disclosure RD 387012, Jul. 10, 1996 (with translation).

Invention Disclosure: Livestock Security Label, Avery Dennison Industrial and Automotive Products Division North American, Nov. 7, 1999 (Ternan letter, Apr. 11, 2002, at Tab 2 and enclosed with Ternan letter, Oct. 7, 2002).

Letter from Rick L. Sandt, Manager Product Development and Technology, Avery Dennison Industrial Products Division to Mr. William Hoover, Product Development Manager, Farnam Companies, Inc., Dec. 16, 1999 (Ternan letter, Apr. 11, 2002, at Tab 2 and enclosed with Ternan letter, Oct. 7, 2002).

Ear tag, Destron Company (text on tag: 191) (Ternan letter, Apr. 11, 2002, at Tab 3).

Ear tag, Drover Ay–one Pty Ltd. (text on tag: WAYNO 062) (Ternan letter, Apr. 11, 2002, at Tab 4).

Article entitled "State–of–the–Art Technology for Drover Ay–One Firm" (Ternan letter, Apr. 11, 2002, at Tab 4).

Derwent search, Dec. 6, 1999 (identified by "B" in upper right hand corner) (Ternan letter, Apr. 11, 2002, at Tab 6).

USPTO search, "livestock identification" with front page of listed patents, Nov. 29, 1999 (identified by "A" in upper right hand corner) (Ternan letter, Apr. 11, 2002, at Tab 7).

Derwent search, Dec. 6, 1999 (identified by "C" in upper right hand corner) (Ternan letter, Apr. 11, 2002, at Tab 8).

Letter from Rick L. Sandt, Manager Product Development and Technology, Avery Dennison Industrial Products Division to Michael J. Balian, Feb. 10, 2000 (enclosed with Ternan letter, Oct. 7, 2002).

Facsimile letter from Rick L. Sandt, Manager Product Development and Technology, Avery Dennison Industrial Products Division to Ted Jacob, Jan. 21, 2000 (enclosed with Ternan letter, Oct. 7, 2002).

Confidentiality agreement between Avery Dennison Corporation and Livestock Identification Industries (enclosed with Ternan letter, Oct. 7, 2002).

Facsimile letter from Rick L. Sandt and Ted Jacob to William Hoover, Jan. 31, 2000 (enclosed with Ternan letter, Oct. 7, 2002).

Amendment to Proprietary Information Disclosure Agreement between Avery Dennison Corporation and Livestock Identification Systems dated Jun. 1, 1999 (enclosed with Ternan letter, Oct. 7, 2002).

Facsimile letter from Rick L. Sandt, Manager Product Development and Technology, Avery Dennison Industrial Products Division to Ted Jacob, Nov. 29, 1999 (enclosed with Ternan letter, Oct. 7, 2002).

Proprietary Information Non–Disclosure Agreement between Avery Dennison Corporation and Livestock Identification Industries (enclosed with Ternan letter, Oct. 7, 2002).

Product literature re: ear tags, Fearing Manufacturing Co., Inc. (enclosed with Ternan letter, Oct. 7, 2002).

* cited by examiner

DECORATED EAR TAGS FOR DOMESTIC ANIMALS AND METHOD OF MAKING SAME

FIELD OF THE INVENTION

The invention relates to the field of ear tags for domestic animals, such as cattle and swine.

BACKGROUND OF THE INVENTION

In early times, ranchers identified their cattle with a brand. Today, however, it is a widespread practice for ranchers to identify their livestock with tags, particularly, ear tags. Ear tags may carry information such as identity, genealogy, health history, weight, age, location, breeding, vaccinations, and other helpful information regarding the animal.

In recent years, the use of identifying tags made of resilient plastic has become common. Plastic tags have the advantage of being legible from greater distances than tags of most sorts, cause less damage to the animal, and are less likely to be accidentally removed than previously used metal tags.

An exemplary ear tag assembly is shown in U.S. Pat. No. 5,228,224. The tag comprises an information panel which is marked to provide identification information. The upper portion of this panel is tapered to form a relatively narrow neck. The neck connects the information panel with an anchoring head. The anchoring head is of generally round form having shoulders which extend laterally from opposite sides of the neck. The tag is affixed to the animal by passing the anchoring head through the animal's ear.

A second exemplary ear tag assembly is shown in U.S. Pat. No. 4,646,455. This second tag comprises a male tag member having a projecting portion which is passed through the animal's ear and is then locked by a receiving portion of a circular female tag member. Once inserted in the receiving portion, the projecting portion cannot be withdrawn, and the tag assembly can only be removed from the animal's ear by cutting the tag or ear.

To date, text or other information applied to a tag's information panel has been applied in one of several ways. In some cases, the information is transferred to the tag's information panel using a hot-stamped foil technique. More recently, the information has been laser printed directly onto the tag's information panel.

Information printed using these techniques, however, only has a relatively short lifespan. Tag information may fade or lose its readability due to exposure to the elements and abrasion over time. Tags are subjected to extremely harsh conditions that blur or erase the identification information on the panel. For instance, an ear tag may be subjected to heat, sunlight, rain, snow, as well as chewing by other animals. There is also a significant amount of abrasion that typically occurs. This abrasion is often the result of the animal moving its head in and out of restraining structures made of steel or wood used in confined livestock operations, or when the animal is scratching or grooming itself on concrete, steel, or lumber within its environment. Foreign materials such as dirt and manure may accumulate on a tag obscuring any information displayed on the tag. Cleaning or reprinting information on a tag is a cumbersome and inefficient solution. Either action must be repeated for the life of the animal. Consequently, a tag that is resistant to erasure and obscurement by abrasion, foreign materials, and the elements, is tamper resistant, waterproof, and durable, would be highly desirable.

In addition, the types of information, and especially graphics information, that may be printed on a tag's information panel using existing techniques is extremely limited. Consequently, a tag that is able to display high print-quality text, images, and other information would also be highly desirable.

SUMMARY OF THE INVENTION

In one aspect, the present invention is directed to a decorated animal tag comprising a printed label fused to a tag blank. The label preferably comprises thermoplastic layers joined by a heat process to form a single layered label with an underlying writing. Prior to heat treatment, the label preferably comprises at least three layers, a release layer, an aliphatic layer, and a printed layer that comprises printed text and other information. During manufacture, the label may additionally comprise a carrier or backing that is removed prior to or at the time of fusing the layered label to a tag blank. The resulting tag protects the printed text and other information by sealing it between the tag blank and the other thermoplastic materials of the label even when the tag is exposed to an environment that is notoriously hostile and adverse.

In another aspect, the present invention is directed to a method for making an animal tag comprising a layered label bonded or fused to a tag blank. In a preferred embodiment, the method may include the steps of providing a carrier, applying a polymeric resin having a slippery substance to the carrier, and if necessary drying the polymeric resin, to form a release layer, applying an aliphatic layer to the release layer and subsequently drying the aliphatic layer to form a solid aliphatic layer, slitting the carrier with the solid aliphatic layer into strips of a desired width and then winding the carrier and solid aliphatic layer with the carrier side in to form a roll of wound material, die cutting each roll of wound material, and applying a printed layer to the wound material to form a label with text, images, and other information, and bonding the label to a tag blank to form a finished tag.

In another aspect, the present invention relates to a method for making decorated animal tags comprising the steps of creating a pre-printed layered label comprising a printed layer and one or more additional layers, and decorating a tag blank by bonding the layered label to the tag blank such that the printed layer is protected between the tag blank and the one or more additional layers.

In another aspect, the present invention relates to a method for producing animal tags that provide high resolution and high print contrast of both human readable information and machine readable data in the form of text, bar codes, two-dimensional codes, or optical character recognition imprints using protective heat fused thermoplastic layers applied using continuous roll form printing and a continuous roll form manufacturing process.

BRIEF DESCRIPTION OF THE DRAWINGS

The above summary of the invention will be better understood when taken in conjunction with the following detailed description and accompanying drawings, in which.

DETAILED DESCRIPTION OF THE PREFERRED EMBODIMENTS

In a preferred embodiment, an animal tag of the present invention is made by bonding a pre-printed single layered label to a suitable tag blank to form a unitary finished tag. The resulting tag, and the information displayed thereby, are extremely resistant to deterioration by sunlight and other elements. In addition, the surface of the information panel of the resulting unitary finished tag has a high slip factor that discourages obscurement of the displayed information by manure, dirt, or other materials adhering to the tag. The printed information displayed by the finished tag can be of high print quality because the information is first printed onto a printed layer, bonded onto a label, and then bonded to a tag blank.

In the following description, a suitable tag blank for use in the present invention is first described. Following this description, a preferred embodiment of a pre-printed single layered label and a method for making the label are described. Then, a preferred embodiment of a finished tag of the present invention and a method of making the finished tag are described.

Figure 1:
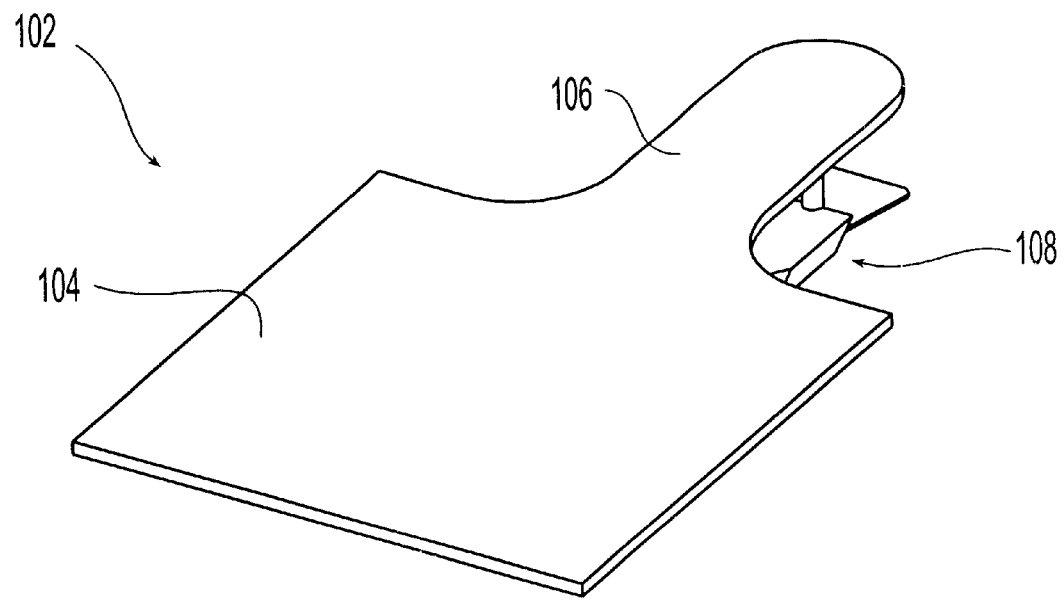
FIG. 1 shows a suitable tag blank for use in the present invention when the tag to be made is for use with cattle.

FIG. 1 shows a suitable tag blank 102 for use in the present invention. As shown in FIG. 1, tag blank 102 preferably comprises an information panel 104 that tapers to a narrow neck portion 106 comprising a projecting portion 108 for insertion through an animal's ear. Tag blank 102 may be made of a resilient plastic, a polyester such as polyethylene glycol ester, cellulose esters such as acetates, triacetates, or butyrates, vinyl resins such as copolymers of vinyl acetate and vinyl chloride, polyethylenes, other rubberlike materials, or combinations thereof. Preferably, tag blank 102 is made of polyester, polyethylene, polyurethane, or combinations thereof.

Figure 2:
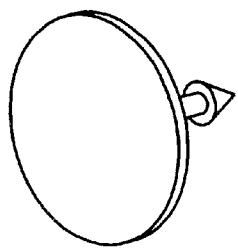
FIG. 2 shows a suitable tag blank for use in the present invention when the tag to be made is for use with swine.

As known in the art, the particular tag blank shown in FIG. 1 is one type of tag blank typically used as an ear tag for cattle. It should be recognized, however, that although the present invention will be primarily illustrated in connection with the tag blank 102 as shown in FIG. 1, the principles of the present invention may be applied to decorate a wide variety of tag blanks of different shapes and attachment means that may be suitable for cattle or other types of animals including, without limitation, horses, swine, goats, sheep, dogs, cats, rabbits, and other animals. When the teachings of the present invention are applied to creating tags for other such animals, the tag blank is preferably one suitable for the particular animal to which the tag is to be affixed. For example, when swine tags are contemplated, a suitable tag blank may have the shape and construction shown in FIG. 2.

Figure 3:
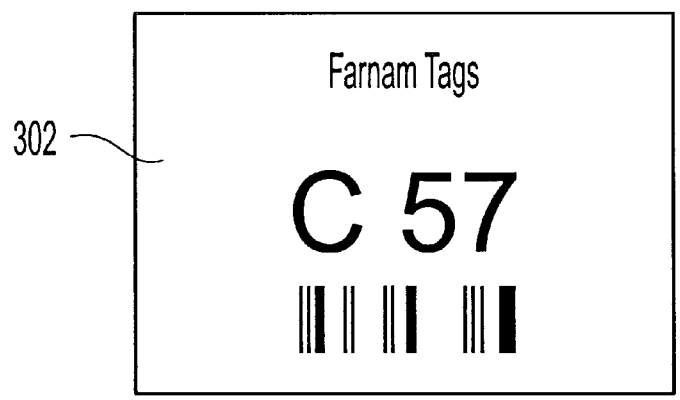
FIG. 3 shows a preferred embodiment of a label for use in the present invention.
Figure 4:
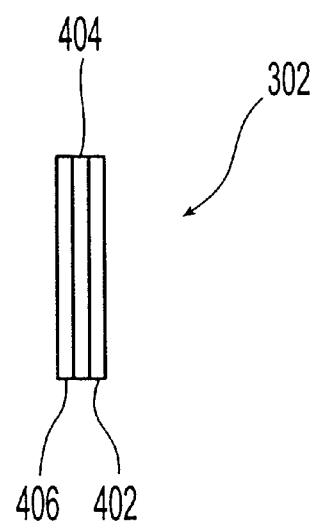
FIG. 4 shows a schematic side view of the label shown in FIG. 3.

FIG. 3 shows a label 302 constructed in accordance with the principles of the present invention and suitable for bonding to a tag blank 102 to create a finished tag. FIG. 4 shows a schematic side view of the various layers of label 302 prior to fusing all layers into one layer. Referring to FIG. 4, label 302 preferably comprises a release layer 402, an aliphatic layer 404, and a printed layer 406, as described in further detail below.

In a preferred embodiment, release layer 402 is a layer of a polymeric resin having a surface comprising a wax or slippery substance. The wax or slippery substance should preferably be in sufficient amount to form a smooth coating having a high slip factor. Because, as described in more detail below, this surface is the exposed label surface on the finished tag, a surface with a high slip factor makes it difficult for manure, dirt, or other foreign materials to stick to the finished single layered label on the tag and obscure the label's printed information. Additionally, as will be described in more detail below, the wax or slippery substance facilitates the release of the finished single layered labeled from a carrier layer during manufacture of the label.

As used herein, the term "slip factor" means the ability of a surface to repel a foreign object such as dirt, manure, grass, feedstuff, fodder, or saliva, among others. Within this context, the term "high" means the ability to repel a foreign object more than 50% of the time.

Typical polymeric resin materials suitable for release layer 402 may include, without limitation, cellulose acetate, cellulose butyrate, cellulose propionate, ethyl cellulose, methacrylate polymers, nitrocellulose, polyester, polypropylene glycols, polystyrene (high or low density), and mixtures thereof. Preferably, such polymeric resins include polyester, ethyl methacrylate, isobutyl methacrylate, methyl methacrylate, and mixtures thereof. Commercially available polymeric resins include Aroplaz A-2477 manufactured by Ashland Chemical Co., P.O. Box 2219, Columbus, Ohio 43216; Acryloid A and B series manufactured by Rohm & Haas Co., 100 Independence Mall West, Philadelphia, Pa. 19106; and Elvacite manufactured by DuPont Canada Inc., Box 2200 Streetsville, Mississauga, Ontario, among others.

Suitable waxes or slippery substances may include without limitation, polyethylene waxes, soft and hard polymeric waxes, paraffin, carnauba, polytetrafluoroethylene (PTFE), high melt polyethylene, polyolefin blends, and combinations thereof. Preferred waxes or slippery substances include polyethylene waxes, polyolefin blends, PTFE, and mixtures thereof. Commercially available waxes or slippery substances include Slip Ayd SL 177 manufactured by Daniel Products at 99 Summerlea Road Brampton, Ontario; and Catalyst 4040 manufactured by BASF Corp., 3000 Continental Drive North, Mount Olive, N.J. 07828, among others.

In a preferred embodiment, the weight of the release layer has a residual weight of about 0.5 $g/m^2$ to about 13 $g/m^2$, preferably from about 1 $g/m^2$ to about 4 $g/m^2$, and more preferably from about 1.4 $g/m^2$ to about 2.2 $g/m^2$.

In a preferred embodiment, the release layer 402 may comprise additional ingredients to prolong the tag's useful lifespan such as UV protectants to protect the tag from sunlight damage or ingredients having a taste that deters animals in a herd from chewing or licking each other's ear tags. In a preferred embodiment, the release layer preferably includes adequate UV protectants to withstand 2500 hours of exposure in a UV chamber without fading or yellowing. Suitable UV protectants may include benzophenones, diphenyl acrylates, and cinnamates, among others. Commercially available UV protectants include, but are not limited to Uvinul® products sold by BASF. In another preferred embodiment, the release layer may comprise an ingredient distasteful to domestic animals such as taste aversion agents. Distasteful ingredients include, but are not limited to, denatonium benzoate, benzinemethanaminium, N-[2-[(2,6-dimethylphenyl)amino]-2-oxoethyl]-N,N-diethyl benzoate, benzyldiethyl[(2,6-xylylcarbamoyl)methyl]ammonium benzoate, and the like. Commercially available distasteful ingredients include, but are not limited to, the RejeX-iT™ products manufactured by PMC Specialties Group, Inc, 501 Murray Road, Cincinnati, Ohio 45217.

In a preferred embodiment, aliphatic layer 404 comprises a layer of an extruded or liquid aliphatic material. When a liquid aliphatic material is used, the liquid comprises an aliphatic material dissolved in a solvent. The skilled artisan can easily determine a suitable solvent with little or no experimentation, depending on the aliphatic material selected. The aliphatic layer 404 preferably has a thickness of about 10 mils to about 0.1 mils, preferably from about 5 mils to about 1 mil, and more preferably from about 2.5 mils to about 2 mils. The aliphatic material can be a vinyl, polypropylene, polyethylene acetates, polyurethane, and mixtures thereof. Preferably, the aliphatic material is an aliphatic polyurethane, polyether polyurethane, or mixtures thereof, and more preferably, the aliphatic material is an aliphatic polycaprolactone polyurethane. Commercially available polyurethanes include the Tecoflex® series, such as CLA-93A-V and CLA-60A-V, manufactured by Thermedics Inc., at 470 Wildwood Street, Woburn Mass., 01801, among others.

As used herein, the term "aliphatic" includes compounds having aliphatic polyurethane wherein the type of isocyanate used to prepare the polyurethane has an aliphatic group and substantially no aromatic groups. Examples include, but are not limited to, polyurethanes prepared with hexamethylene diisocyanate, methylene dicyclohexyldiisocyanate, isopherone diisocyanate, and the like.

In a preferred embodiment, printed layer 406 comprises a resin preferably applied from a thermal ribbon or thermal label, as described in more detail below. Printed layer 406 may comprise characters, shapes, bar codes, two dimensional codes, optical character recognition imprints, or other human readable and/or machine readable data, as desired. The resin includes, but is not limited to, polystyrene, chlorinated rubber, poly (methyl methacrylate), synthetic rubber, isobutylene/isoprene copolymer, butyl rubber, butadieneacrylonitrile copolymers, butyl methacrylate mix, ethylene vinyl acetate copolymer, and mixtures thereof. Preferable resins include polystyrene, butyl rubber, chlorinated rubber, and mixtures thereof. Commercially available resins include the Polysar® series manufactured by Bayer Coatings and Colorants Division, 100 Bayer Road, Pittsburgh, Pa. 15205-9741; the Parlon® series manufactured by Hummel Croton Inc., 10 Harmich Road, South Plainfield, N.J. 07080-4899; and Elvax® products manufactured by DUPONT. Optionally, the printed layer may contain waxes or slippery substances such as those described above.

In a preferred embodiment, the printed layer is applied such that it has a weight of about 0.009 g/m² to about 6 g/m², preferably from about 1.1 g/m² to about 2.5 g/m², and more preferably from about 1.6 g/m² to about 2.2 g/m².

In a preferred embodiment, printed layer 406 may include resins that have a black colorant as well as resins having other colorants. Thus, a single-color or multi-color decorated label may be provided comprising black or other color text, graphics, and other information.

Figure 5:
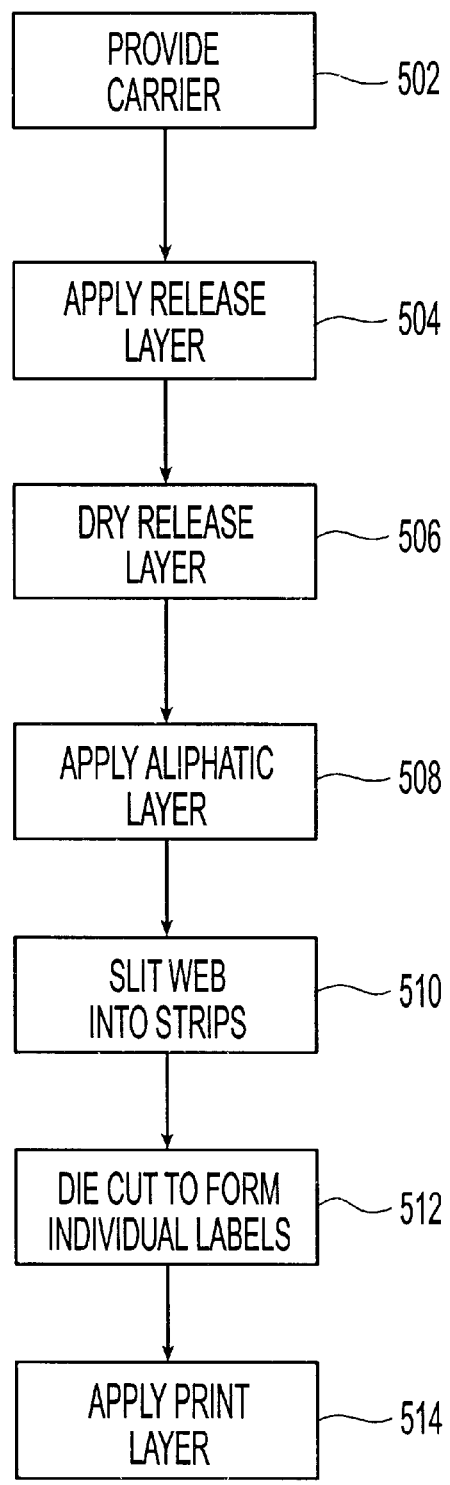
FIG. 5 is a flowchart depicting a preferred embodiment for making the label shown in FIG. 3.

A preferred embodiment of a method for producing label 302 is now described in connection with the flowchart of FIG. 5. As shown in FIG. 5, in step 502, a carrier or mat is provided that provides a surface to which subsequent layers or coatings may be applied. The carrier may be made of materials including, without limitation, polyethylene terephthalate (Mylar®), polyester, vinyl, high and low density polyethylene, paper, polypropylene, and combinations thereof. Preferably, the carrier is made of polyester. More preferably the carrier material is a colored polyester. Commercially available carrier materials include, but are not limited to, the SW03G series manufactured by SKC America at 850 Clark Drive, North Mount Olive, N.J. 07828, among others. The thickness of the carrier is from about 0.5 mil to about 10 mils, preferably from about 1 mil to about 3 mil, and more preferably from about 1.5 mil to about 2 mils. A skilled artisan may easily determine the amount of colorant or pigment necessary to achieve the desired surface roughening. Typically, the pigment present in the colored polyester is present in an amount of about 0.05% to about 20%, preferably, from about 2% to about 15%, and more preferably from about 8% to about 10% by weight of the polyester.

The carrier preferably includes at least one surface sufficiently roughened to attach or bond to a subsequent release layer and yet capable of separating from the release layer at a temperature between about 180° F. to about 400° F., and preferably at a temperature of about 230° F. to about 250° F.

Surface roughening may be achieved during the manufacture of the carrier or after the manufacture of the carrier by either physical or chemical means. Physical means may include brushing the carrier surface with a wire brush to cause sufficient surface scarring or including small air pockets within the carrier material during manufacture. Chemical means may include adding a colorant or pigment to the polymer material forming the carrier in a sufficient amount to create a surface roughened by the presence of colorant.

In step 504, release layer 402, in the form of a polymeric resin coating material, is applied to the carrier. This polymeric resin coating material preferably comprises a polymeric resin and at least one wax or slippery substance dissolved within an evaporable solvent that upon application and subsequent solvent evaporation fills in the carrier's surface grooves or indentations forming a solid surface bonded onto the carrier.

In a preferred embodiment, the polymeric resin coating material is applied at a temperature of about 60° F. to about 85° F., preferably at room temperature. The polymeric resin coating material is applied at a rate to obtain a residual weight of about 0.5 g/m² to about 13 g/m², preferably a weight of about 1 g/m² to about 4 g/m², and more preferably a weight of about 1.4 g/m² to about 2.2 g/m² to form the release layer. The skilled artisan with little or no experimentation can apply the polymeric resin coating material using a metering rod, applicator rod, Mayer bars, equalizer bars, coating rods, doctor rods, or gravure coating techniques, as is well known in the art. The release layer preferably has a melting point of about 160° F. to about 300° F., and more preferably a melting point of about 180° F. to about 250° F.

Typical polymeric resin materials and waxes or slippery substances suitable for forming the release layer are discussed above. The evaporable solvent maybe either water or an organic solvent and should preferably be in sufficient amount to dissolve the polymeric resin and wax or slippery substance material. Suitable evaporable organic solvents may include, without limitation, dimethylforamide (DMF), phenol, m-cresol, tetrahydrofuran (THF), formic acid, dioxane, dimethyl sulfoxide (DMSO), N,N- dimethylacetamide (DMA), acetone, methyl ethyl ketone, toluene, 2-ethoxyethanol, 2-ethoxy ethyl acetate, glycol ethyl acetate, ethyl acetate, butyl acetate, and mixtures thereof. Commercially available solvents include, but are not limited to, cellesolve and Corsol EEA manufactured by Orica Chemical 9781 South Meridian Boulevard, Englewood, Colo. 80112. One skilled in the art may easily determine the necessary amount of evaporable solvent based upon the amount of polymeric resin and waxes or slippery substances.

Once the polymeric resin coating material is applied, the coating is dried to form the release layer upon the carrier (step 506). The polymeric resin coating can be dried by evaporating the solvent using blowing air, heating ovens, drying lamps, or any other method commonly used in the industry, or combinations thereof. The drying step should preferably be carried out at a time and temperature sufficient to allow slow solvent evaporation such that the wax or slippery substance within the polymeric resin coating material slowly rises to the surface of the release layer.

A skilled artisan can easily determine the suitable drying temperature and time, as both are dependent upon the layer thickness. For the thicknesses described above, the drying step is preferably carried out at a temperature of about 100° F. to about 360° F., preferably at a temperature of about 120° F. to about 250° F., and more preferably from about 160° F. to about 180° F., and for a time of about 1 s to about 10 s, preferably for a time of about 2 s to about 6 s, and more preferably for a time of about 3 s to about 4 s. The coating can be dried in conventionally used equipment such as a combustible air tunnel and the like.

Once dry after application, the polymeric resin coating material should preferably have a residual weight of about 0.5 g/m$^2$ to about 13 g/m$^2$, preferably, from about 1 g/m$^2$ to about 4 g/m$^2$, and more preferably, from about 1.4 g/m$^2$ to about 2.2 g/m$^2$.

In step 508, aliphatic layer 404 is applied onto release layer 402. More particularly, a layer of extruded liquid aliphatic coating material is preferably attached or pressed in a liquid state from a die onto the release layer 402. The extruded liquid aliphatic coating material may be applied at a temperature of about 220° F. to about 400° F., preferably at a temperature of about 300° F. to about 390° F., and more preferably at a temperature of about 350° F. to about 380° F. Optionally, the aliphatic layer 404 may be applied as a liquid aliphatic coating material, i.e., as an aliphatic material dissolved in a suitable solvent or a hot melt, and allowed to dry. Either the extruded or liquid aliphatic material may be pressed onto the first layer using a roller coated with a non-sticking material such as Teflon®. When extruded, the aliphatic material layer thickness is determined by the roller speed; at low speeds the layer is thicker, at high speeds, the layer is stretched prior to being applied onto release layer 402 creating a thinner aliphatic layer. Typical thickness of the aliphatic coating material layer may be about 10 mils to about 0.1 mils, preferably from about 5 mils to about 1 mil, and more preferably from about 2.5 mils to about 2 mils. Subsequently, the carrier with the release and aliphatic layers is allowed to air cool and is wound on a roller. Preferably, the layers are rolled with the carrier side in. Upon cooling the aliphatic layer bonds to the release layer forming a solid aliphatic layer.

In a preferred embodiment, in step 510, the carrier with the release layer and the aliphatic layer is slit into strips of a desired width and subsequently wound carrier side in, i.e., the aliphatic layer 404 faces out. In this preferred embodiment, winding the carrier layer side in avoids warping of the rolled material because of memory differences between the layers or films, i.e., the release and aliphatic layers are pressed inwards towards each other and the carrier layer, thus setting the tensile memory of the wound layers.

Figure 6:
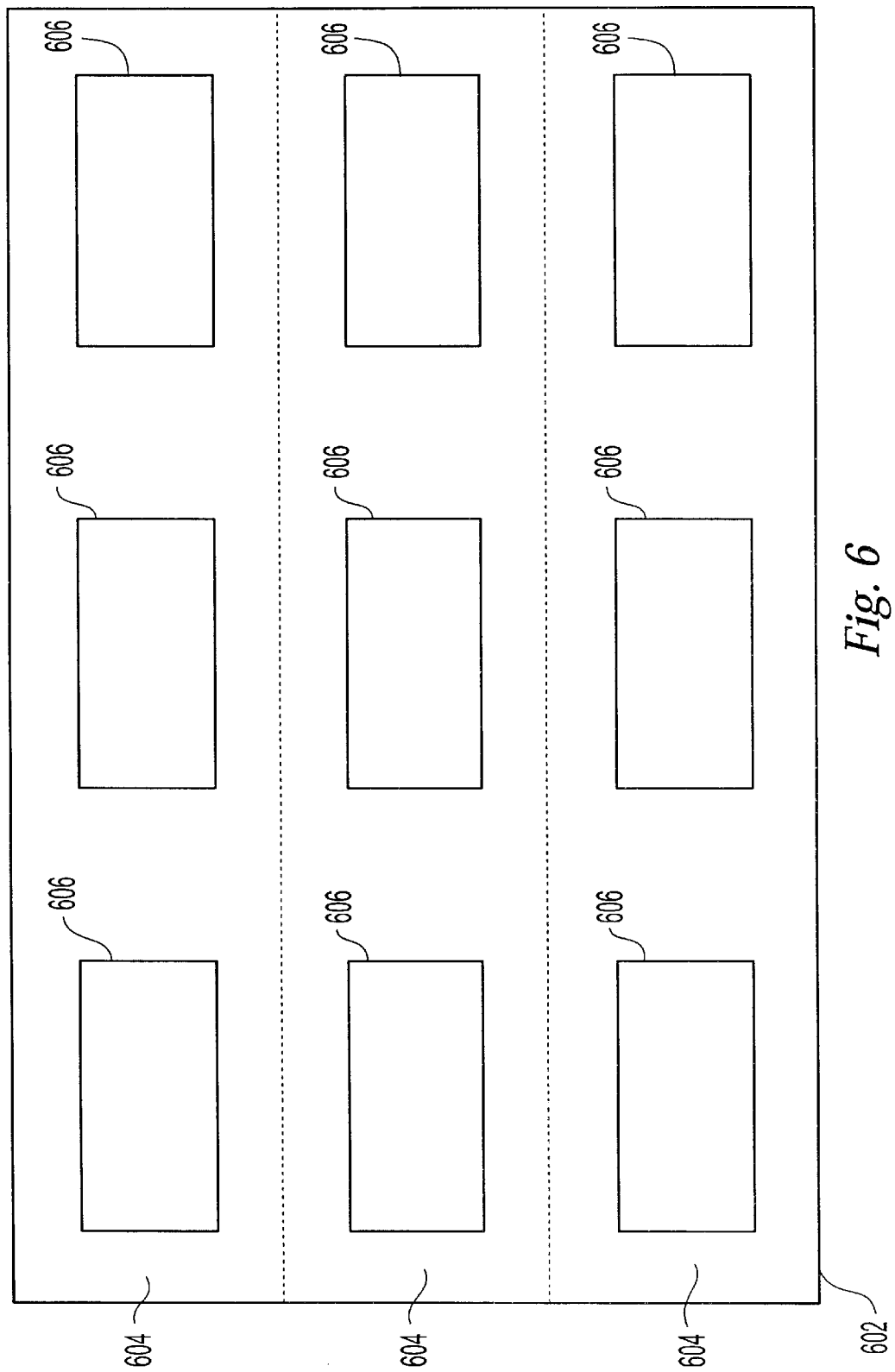
FIG. 6 schematically illustrates the effects of slitting and die cutting label material to create a plurality of individual labels.

In a preferred embodiment, in step 512, each wound roll is die cut to form individual labels. The effects of slitting and die cutting steps 510, 512 are schematically represented in FIG. 6. In particular, as shown in FIG. 6, an original web of material 602 comprising the carrier covered with release layer 402 and aliphatic layer 404 is first slit in step 510 into desired widths 604 and then individual labels 606 are die cut from the slit web in step 512. The steps of winding, step 510, and die cutting, step 512, can be performed in any order, including after step 514.

In step 514, printed layer 406 of printed characters or other information is applied to aliphatic layer 404. The printed characters or information may be applied using dot matrix printing, screen printing, offset printing, ink jet printing, laser printing, direct thermal printing, thermal transfer printing, or any other method known in the art. In a preferred embodiment, the printed characters or information are applied using thermal transfer printing. This preferred embodiment is further described in connection with FIG. 7.

Figure 7:
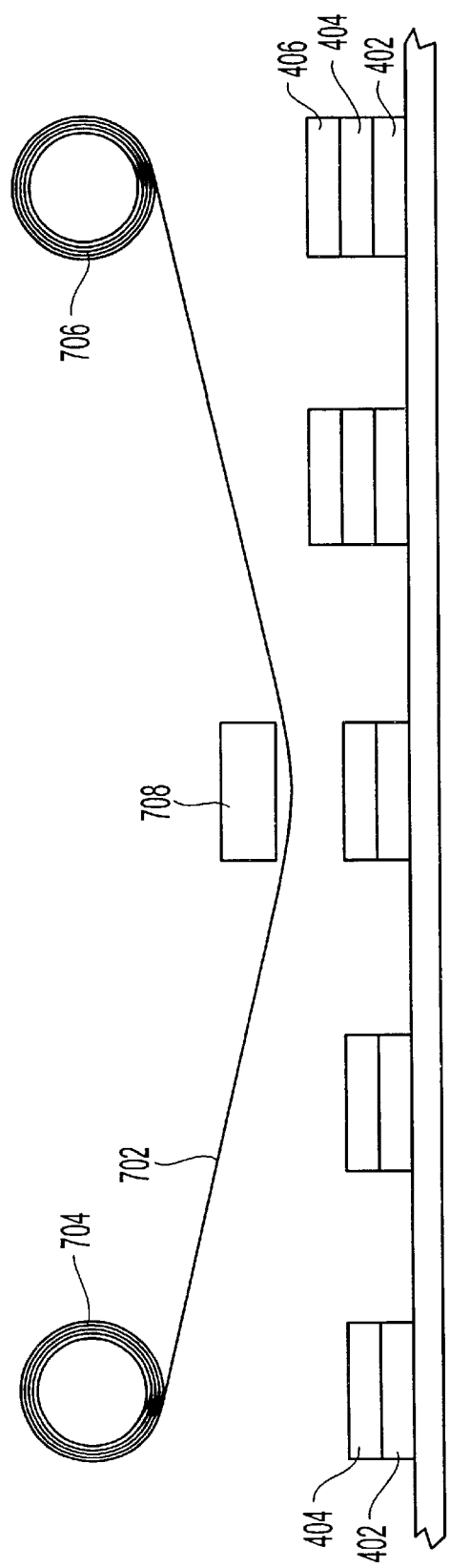
FIG. 7 shows a preferred arrangement for creating the printed layer of the label shown in FIG. 3.

As shown in FIG. 7, in a preferred embodiment, a thermal ribbon 702 runs from a first roller 704 to an uptake roller 706 between aliphatic layer 404 and a thermal printing head 708. Thermal ribbon 702 preferably comprises a ribbon that is coated with an appropriate resin for forming printed layer 406 as described above. The resin may be applied to thermal ribbon 702 using applicator means known to those skilled in the art. Thermal printing head 708 is preferably provided with a plurality of heatable printing pins. In a preferred embodiment, thermal printing head 708 may be provided with between 200 and 600 pins per inch, and in a further preferred embodiment may be provided with approximately 305 pins per inch. As thermal ribbon 702 passes from roller 704 to roller 706, selective pins of thermal head 708 representative of a character or other information to be printed are heated to cause the resin from thermal ribbon 702 to be transferred from the ribbon to form printed layer 406 of label 302. A suitable thermal printer for implementing step 514 is a Zebra printer, XI series, manufactured by Zebra Technologies Corporation, 333 Corporate Woods Parkway, Vernon Hills, Ill. 60061-3109.

In a preferred embodiment, printed layer 406 is applied onto the solid aliphatic layer at a temperature and pressure sufficient to cause the printed matter to penetrate the interstices of the solid aliphatic layer and form a unitary layer that cannot be separated without destruction of label 302. In an alternative embodiment, desired characters or other shapes may be precut in thermal ribbon 702 before step 514 is performed.

During application of printed layer 406, the temperature is preferably sufficient to melt, fuse, or bond the printed layer onto the solid aliphatic layer without blurring the printed text, image, or other information. Hence, the printed matter on the printed layer should preferably have a melting point above the melting point of the aliphatic layer. The application temperature should be about 650° F. to about 200° F., preferably about 550° F. to about 300° F., and more preferably about 450° F. to about 350° F. In a preferred embodiment, the printed layer is applied such that it has a weight of about 0.009 g/m$^2$ to about 6 g/m$^2$, preferably from about 1.1 g/m$^2$ to about 2.5 g/m$^2$, and more preferably from about 1.6 g/m$^2$ to about 2.2 g/m$^2$.

In a preferred embodiment, characters or other information that make up printed layer 406 are preferably disposed on aliphatic layer 404 in mirror image so that the printed information is readable when viewed through release layer 402 and aliphatic layer 404. In yet another embodiment of the invention, a second printed layer may be placed upon the printed layer 406. This second printed layer may contain graphics, additional printed text, or another bar code, in addition to the originally printed layer 406.

As noted above, in a preferred embodiment, printed layer 406 may include resins that are black as well as resins that are other colors. Thus, a single-color or multi-color decorated tag may be provided comprising black or other color text, graphics, and other information. For example, to create a two color tag comprising black text and a color logo, step 514 may be repeated twice: once to apply the black text, and a second time to apply the color logo.

In a further preferred embodiment, label 302 may comprise an optional additional layer or layers disposed over printed layer 406. Such an additional layer or layers may be applied for several reasons. For example, in one preferred embodiment, an additional layer may be provided that is adapted to bind to the top of printed layer 406 without becoming fused with any of the other layers of label 302 to improve the adhesion of the label to the tag blank. In another preferred embodiment, an additional opaque white layer may be applied behind black portions of printed layer 406 (e.g., a printed bar code) to improve readability of the bar code by increasing the contrast between the bar code and its background. Such a white layer may preferably be applied in a manner similar to that described above in connection with FIG. 7, where the thermal tape comprises a white resin.

Once the labels are completed, each label 302 is thermally applied to a tag blank 102. In a preferred embodiment, the label is joined to a tag blank 102 under pressure and at a die face temperature of about 150° F. to about 550° F., preferably at a temperature of about 300° F. to about 500° F., and more preferably, at a temperature of about 400° F. to about 430° F. The dwell time for application may be about 0.5 s to about 6 s, preferably about 1 s to about 3 s, and more preferably for about 1.5 s to about 2.5 s at a pressure of about 70 psi to about 100 psi, and preferably at about 80 psi to about 100 psi. Under these conditions, label 302 separates from the carrier and bonds to tag blank 102. In a preferred embodiment, each side of tag blank 102 is exposed to pressure (even if only one side of the tag is to be printed) to avoid tag warping, as described in more detail below. Tag stamping may be performed using hot stamping machines such as those manufactured by UMC, 488 De Guigne Drive, Sunnyvale, Calif. 94086.

Alternatively, each label 302 may be applied alone or in combination with another label 302 onto the tag blank 102. In this embodiment, each label 302 is aligned alone or in sequence and covered with a non-stick sheet such as a teflon sheet. Thereafter, sufficient heat and pressure are applied by manual means onto the non-stick sheet to bond the labels onto the tag. Manual means may include, but are not limited to, an iron. Thereafter, the non-stick sheet is removed.

Figure 8:
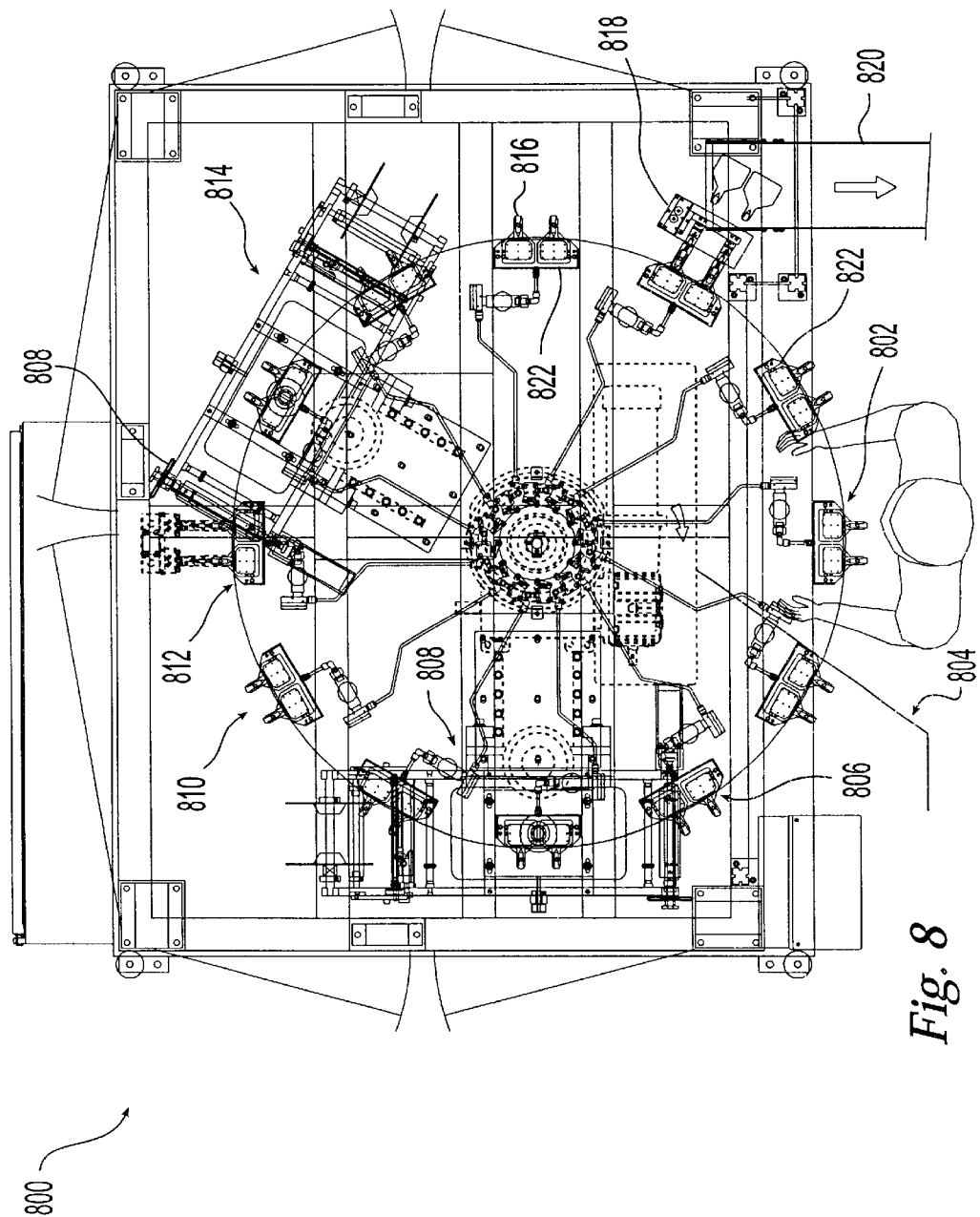
FIG. 8 shows a preferred embodiment of a machine for bonding a label to a tag blank.

In a preferred embodiment, an automated or semi-automated tag stamping machine may be used to apply labels 302 to tag blanks 102. A preferred embodiment of one such machine is shown in FIG. 8. As shown in FIG. 8, a preferred machine 800 comprises a plurality of stations including a tag blank station 802, a swing gate 804, a first inspection station 806, a first stamping station 808, a second inspection station 810, a tag flipping station 812, a second stamping station 814, a third inspection station 816, a tag removal station 818, and a dump chute 820. The perimeter of machine 800 is provided with a plurality of nests 822. Each nest 822 is preferably provided with two seats, each of which is adapted to hold a tag blank 102.

During operation, machine 800 preferably rotates clockwise. An operator 824 places two tag blanks 102 into a nest 822 each time a nest passes tag blank station 802. As the tag blanks rotate past swing gate 804, suction is applied to firmly seat tag blanks 102 within nest 822.

At first inspection station 806, it is determined whether a pair of tag blanks 102 are properly seated in nest 822. If they are, the tag blanks are advanced to first stamping station 808 where they are stamped by a hot stamping machine such as the one described above. If, however, first inspection station 806 detects that tag blanks 102 are not properly seated in nest 822, or that nest 822 has one or more empty seats, first stamping station 808 is disabled so that it will not stamp.

Stamping by the hot stamping machine causes release layer 402 of a die cut label (from a roll of die cut labels 302 fed into machine 800 at first stamping station 808) to release from the carrier and causes the layers of label 302 to become a single film with tag blank 102. More specifically, release layer 402 fuses with the aliphatic layer. In addition, the cohesive properties of aliphatic layer 404 cause it to bond permanently to tag blank 102 trapping printed layer 406 between the tag blank and the aliphatic layer. Because printed layer 406 has a higher melting point than aliphatic layer 404, aliphatic layer 404 develops a cohesive bond with tag blank 102 without causing the character or other information on the printed coating 406 to lose sharpness or readability. The information content of printed layer 406 may then be read through release layer 402 and aliphatic layer 404, which are preferably transparent.

The stamped tag is then advanced to second inspection station 810 where the printed text of the tag is examined to ensure that it is sharp and readable. This may be accomplished using a scanner, such as a laser scanner.

The tag is then advanced to tag flipping station 812. At tag flipping station 812 the tag (which has so far been stamped on one side) is flipped over to facilitate processing of the tag's second side.

The tag is then advanced to second stamping station 814. Here, the tag is stamped under heat a second time so as to avoid warping of the tag that may occur if only one side of the tag is stamped. In addition, if desired, a second roll of die cut labels may be fed to machine 800 at second stamping station 814 and a second label may be applied to the second side of tag blank 102. This permits tags to be created that contain printed text or other information on both sides of the tag.

The tag is then advanced to third inspection station 816. There, the tag is again inspected for quality control purposes. If a label with text was bonded to the second side of tag blank 102 at second stamping station 814, this inspection may include scanning of the text to ensure readability and sharpness, as described above.

The tag is then advanced to tag removal station 818, where the finished tags are removed from machine 800 via dump chute 820. In a preferred embodiment, the rotation speed of machine 800 may be chosen so as to produce The first preferred embodiment of machine 800 is preferably adapted to produce approximately 1000-1200 tags per hour.

In a further preferred embodiment, the design and operation machine 800 may be modified to increase throughput. In particular, in this preferred embodiment, instead of positioning first stamping station 804 at approximately the 9 o'clock position along the circumference of machine 800 as shown in FIG. 8, stamping station 804 may be positioned at approximately 8 o'clock along the circumference of machine 800 (with an appropriate adjustment to the position of station 806), thus increasing the distance between first stamping station 804 and second stamping station 814. Alternatively, the increased distance between the stamping stations may be achieved by positioning second stamping station 814 at 2 o'clock along the circumference of machine 800, rather than at 1 o'clock as shown in FIG. 8. In addition, in this further preferred embodiment, tag flipping station 812 is either removed from machine 800 or disabled.

During operation of this further preferred embodiment, machine 800 is rotated at approximately twice the rate as in the first-described preferred embodiment of machine 800, and first stamping station 808 and second stamping station 814 are each adapted to stamp the tags in every other nest 822 as they rotate past the stamping stations. For example, first stamping station 808 may be adapted to stamp the first, third, fifth, etc. nests 822 that rotate past that station (i.e., every odd numbered nest), while second stamping station 814 may be adapted to stamp the second, fourth, sixth, etc. nests 822 that rotate past that station (i.e., every even numbered nest). Thus, four tags are stamped per machine cycle, as compared to two tags per machine cycle in the first-described preferred embodiment of machine 800.

As will be recognized, in this further preferred embodiment tags are preferably loaded onto machine 800 at approximately twice the rate as in the first-described preferred embodiment of machine 800 since machine 800 is rotating at approximately twice the speed as in that embodiment. Accordingly, additional manpower may be provided to load machine 800 in this further preferred embodiment.

In addition, it should be recognized that this further preferred embodiment applies tags to only one side of each tag blank. It has also been found that although in this further preferred embodiment tag flipping station 812 is disabled or removed and consequently only one side of the tag blank is stamped, this has not resulted in significant curling of the finished tags, apparently because the suction in nests 822 holds the tags flat during cooling.

Figure 9:
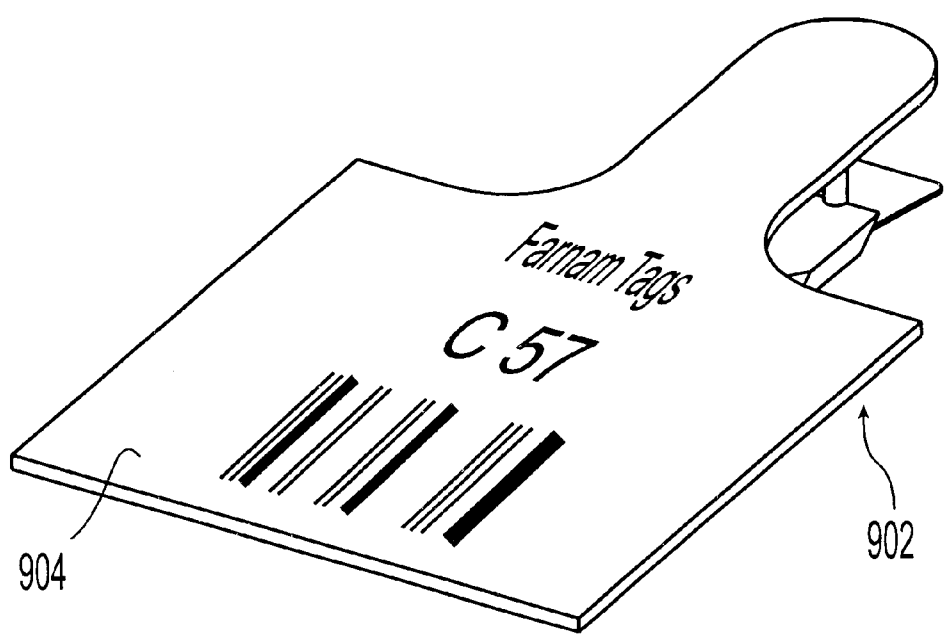
FIG. 9 shows a preferred embodiment of a finished tag of the present invention.

A preferred embodiment of a finished tag in accordance with the present invention is shown in FIG. 9. The finished tag 902 preferably includes a plurality of layers bonded to form a single unitary tag. The outer surface 904 of tag 902 is composed of the material of release coat 402. As noted, this material preferably provides a high slip factor to this surface of tag 902 so that manure and other dirt will tend to slide off of tag 902 rather than stick to the surface of the tag and obscure the printed information. Between this outer surface and the polyurethane material of tag blank 102 are the material of aliphatic layer 404 and printed layer 406 which, as noted, are permanently bonded to the material of tag blank 102 and release coat 402.

EXAMPLES

Certain embodiments of the invention, as well as certain novel and unexpected advantages of the invention, are illustrated by the following non-limiting example.

Example 1
Method for Making an Animal Tag

A roll of white polyester #SOO822 from SKC Corporation measuring 50 inches wide and 2–3 mils thick was coated with a melted aliphatic mixture using a Mayer bar. The aliphatic mixture was made of 71% methyl ethyl ketone, 12% toluene, 7.2 Corsol EEA, 7.2% of cellesolve, 2% Elvacite 2041, 0.5% Slip Ayd S1-177, and 0.1% Aroplaz 2477×65. The aliphatic mixture was mixed until all ingredients are mixed uniformly, for about 8 hours. Thereafter, a polyether urethane was applied by extrusion onto the coated polyester using a rolling web method to obtain a layer of about 2 mils thick. The double coated material was then wound.

The roll was slitted into rolls of about 6 to 7 inches wide and each roll was die cut without cutting the white polyester layer. Non-label excess material was removed and discarded, leaving the labeled shaped material rolled on the white polyester.

Separately, a ribbon was prepared by mixing 51.5% toluene, 31% MEK, 6% polystyrene 555–300, 6% carbon black, 2.5% Alloprene R5, 1% solution of 1:1 Aroplaz with a solution of toluene, 1% Slip Ayd SL 177, 0.6% of K1717B, and 0.4% Igepal CO 530 and applying the mixture onto a polyester film. A Datamax DMX-I-4206 thermal printer imprinted an image upon the ribbon to make the printed layer. The image applied onto the thermal ribbon had a standard design for identifying animals, i.e., a thermal image. After slitting, the printed layer was rewound with a reversed mirror image and placed on a heat transfer machine.

The printed layer was placed onto the labeled shaped material and pressed at a pressure and at a temperature until the thermal ribbon was thermally bonded onto the labeled shaped material to form label.

Blank tags were loaded onto a rotary table having 12 stations. A label was positioned above each tag and stamped with a heat transfer unit at about 60 psi and 475° F. bonding the label onto the tag.

What is claimed is:

1. An animal tag, comprising:
   a tag blank;
   a release layer, the release layer having a first surface, the first surface having a slip factor greater than that of the tag blank;
   an aliphatic layer, the aliphatic layer bonded to a second surface of the release layer and to the tag blank; and
   a printed layer comprising printed information disposed between the tag blank and the aliphatic layer.

2. The animal tag of claim 1, wherein the release layer comprises a polymeric resin.

3. The animal tag of claim 2, wherein the polymeric resin is cellulose acetate.

4. The animal tag of claim 2, wherein the polymeric resin is cellulose butyrate.

5. The animal tag of claim 2, wherein the polymeric resin is cellulose propionate.

6. The animal tag of claim 2, wherein the polymeric resin is ethyl cellulose.

7. The animal tag of claim 2, wherein the polymeric resin is a methacrylate polymer.

8. The animal tag of claim 2, wherein the polymeric resin is nitrocellulose.

9. The animal tag of claim 2, wherein the polymeric resin is polyester.

10. The animal tag of claim 2, wherein the polymeric resin is polypropylene glycol.

11. The animal tag of claim 2, wherein the polymeric resin is polystyrene.

12. The animal tag of claim 1, wherein the slip factor of the release layer surface of the release layer is a slippery substance in the release layer.

13. The animal tag of claim 12, wherein the release layer with the slip factor repels dirt, manure, grass, feedstuff, fodder, saliva, or mixtures thereof more than 50% of the time.

14. The animal tag of claim 12, wherein the slippery substance is a wax.

15. The animal tag of claim 1, wherein the release layer has a melting point of about 180° F. to about 400° F.

16. The animal tag of claim 1, wherein the residual weight of the release layer is about 0.5 g/m$^2$ to about 13 g/m$^2$.

17. The animal tag of claim 1, wherein the release layer comprises at least one additional ingredient selected from the group consisting of UV protectants and taste aversion agents.

18. The animal tag of claim 1, wherein the aliphatic layer has a thickness of about 0.1 mils to about 10 mils.

19. The animal tag of claim 1, wherein the printed layer comprises high resolution and high print contrast human readable data.

20. The animal tag of claim 1, wherein the printed layer comprises at least one colorant.

21. The animal tag of claim 20, wherein the colorant is a black colorant.

22. The animal tag of claim 20 comprising at least two colorants.

23. The animal tag of claim 20, wherein the colorant is a colorant other than black.

24. The animal tag of claim 19, wherein the data is in the form of text.

25. The animal tag of claim 1, wherein the printed layer comprises black colorant containing high resolution and high print contrast machine readable data.

26. The animal tag of claim 25, wherein the data is in the form of a bar code.

27. The animal tag of claim 25, wherein the data is in the form of a two dimensional code.

28. The animal tag of claim 25, wherein the data is in the form of an optical character recognition imprint.

29. The animal tag of claim 1, wherein the printed layer has a higher melting point than the aliphatic layer.

* * * * *